T. P. SIBLEY.
Combined Sheep Shed and Rack.
No. 57,983. Patented Sept. 11, 1866.
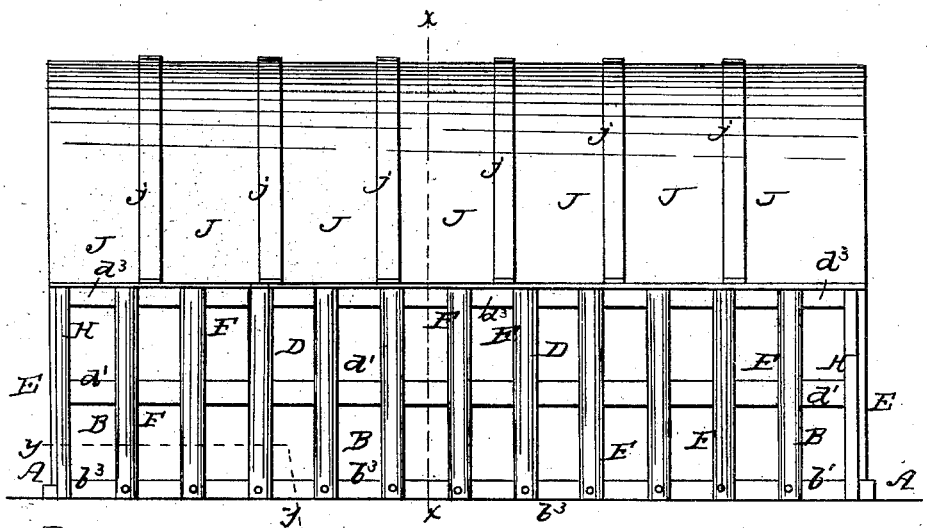
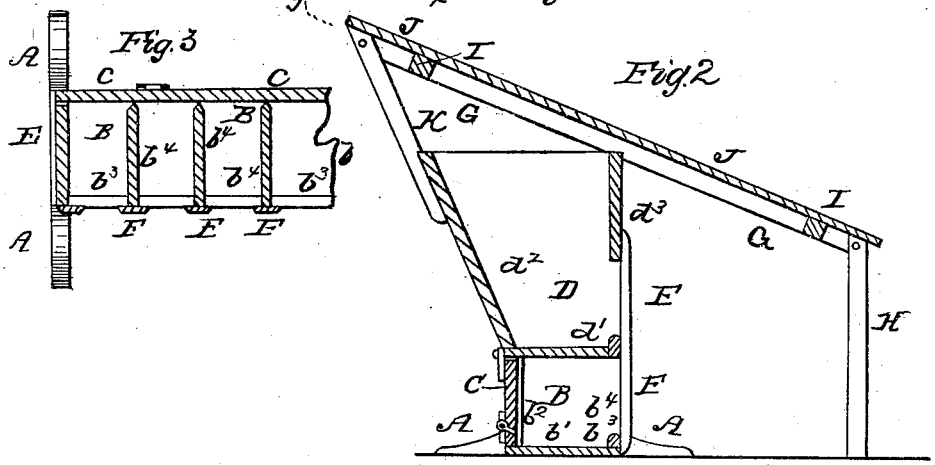
WITNESSES
INVENTOR

UNITED STATES PATENT OFFICE.

T. P. SIBLEY, OF OBERLIN, OHIO.

IMPROVEMENT IN COMBINED SHEEP SHED AND RACK.

Specification forming part of Letters Patent No. 57,983, dated September 11, 1866.

*To all whom it may concern:*

Be it known that I, T. P. SIBLEY, of Oberlin, Lorain county, and State of Ohio, have invented a new and Improved Combined Sheep Shed, Hay-Crib, and Grain-Trough; and I do hereby declare that the following is a full, clear, and exact description thereof, which will enable others skilled in the art to make and use the same, reference being had to the accompanying drawings, forming part of this specification, in which—

Figure 1 is a rear view of my combined sheep shed, hay-crib, and grain-trough. Fig. 2 is a vertical cross-section of the same, taken through the line $x\ x$, Fig. 1. Fig. 3 is a detail sectional view of the same, taken through the line $y\ y$, Fig. 1.

Similar letters of reference indicate like parts.

My invention has for its object to furnish a convenient means for feeding sheep with grain and hay, and which will at the same time afford them a shelter while feeding; and it consists in the combination of a shed, crib, and trough with each other, the parts being constructed and arranged as hereinafter more fully described.

A are the ground sills or timbers, upon which the ends of the structure rest. These sills A should be of such a length as to prevent the shed from being overturned by the wind.

The trough B is formed of the bottom boards, $b'$, and the front and rear ledges, $b^2$ and $b^3$, and it is divided into compartments by partitions $b^4$, these partitions being placed about a foot apart, and designed to prevent the sheep from getting each other's grain.

The upper edge of the rear ledge, $b^3$, is rounded off, as shown in Fig. 2. The upper edge of the front ledge, $b^2$, is made inclined, and to it is hinged the door C, which closes the front side of the trough B, and through which the grain is placed in the trough.

The bottom $d'$ of the hay-crib rests upon the upper edges of the partitions $b^4$, and its sides extend up sufficiently high to enable the crib to contain the desired amount of hay. The front side, $d^2$, is close, and is inclined forward, as shown in Fig. 2. The rear side, $d^3$, is vertical, and its lower part is cut away, as shown in Fig. 2, so as to allow the sheep to have access to the hay.

The ends of both trough and crib are closed by end boards, E, which also serve to connect the trough and crib to each other.

F are slats, the upper ends of which are attached to the rear side board, $d^3$, the middle part to the edge of the bottom $d'$ of the crib D, and the lower ends to the edge of the bottom $b'$ of the trough B, as shown in Figs. 1 and 2. These slats F are so placed as to cover the rear edges of the partitions $b^4$, as shown in Figs. 1 and 3. For ordinary-sized sheep they should be about six inches wide and six inches apart; but for very large sheep the spaces between the slats may require to be a little wider.

G are the rafters, which are stepped at about their middle points to the rear edge of the crib D, as shown in Fig. 2. The forward ends of the rafters G are sustained by supports K, which are attached to the front side, $d^2$, of the crib, and project upward to meet the forward ends of the rafters G. The rear ends of the rafters are supported by uprights H, as shown in Fig. 2.

I are ribs attached to the rafters G, and which support the covering of the roof.

The covering of the roof may be formed of boards J, laid edge to edge, the joints being covered by strips $j$, as shown; or it may be formed in any other convenient manner.

I claim as new and desire to secure by Letters Patent—

The combination of the shed G I J, the hay-crib D, and grain-trough B with each other, the said shed, crib, and trough being constructed and arranged substantially as herein described, and for the purposes set forth.

T. P. SIBLEY.

Witnesses:
W. P. HARRIS,
J. W. MATTISON.